(12) United States Patent
Zegowitz et al.

(10) Patent No.: US 12,528,559 B2
(45) Date of Patent: Jan. 20, 2026

(54) CRANK SPINDLE SET-UP, CONTROL AND/OR EVALUATION METHOD AND UNIT FOR A CRANK SPINDLE SET-UP, AND VEHICLE

(71) Applicant: Robert Bosch GmbH, Stuttgart (DE)

(72) Inventors: Michael Zegowitz, Tuebingen (DE); Christoph Ossmann, Reutlingen (DE); Frank Schatz, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 706 days.

(21) Appl. No.: 17/886,510

(22) Filed: Aug. 12, 2022

(65) Prior Publication Data

US 2023/0053529 A1  Feb. 23, 2023

(30) Foreign Application Priority Data

Aug. 18, 2021  (DE) .................... 10 2021 209 073.7

(51) Int. Cl.
*B62M 6/50*  (2010.01)
*B62M 3/00*  (2006.01)
*B62M 6/55*  (2010.01)

(52) U.S. Cl.
CPC ............... *B62M 6/50* (2013.01); *B62M 3/00* (2013.01); *B62M 6/55* (2013.01)

(58) Field of Classification Search
CPC ... B62M 6/50; B62M 6/55; B62M 3/00; B62J 45/411; B62J 45/421
See application file for complete search history.

(56) References Cited

U.S. PATENT DOCUMENTS

| | | | |
|---|---|---|---|
| 8,807,260 B2* | 8/2014 | Shimizu | B62J 45/421 |
| | | | 180/220 |
| 10,557,765 B2* | 2/2020 | Lanter | B62M 6/40 |
| 11,320,328 B2* | 5/2022 | Hsu | G01L 3/101 |
| 2018/0118304 A1* | 5/2018 | Greven | B62M 3/003 |

FOREIGN PATENT DOCUMENTS

| | | |
|---|---|---|
| DE | 202008018111 U1 | 8/2011 |
| DE | 102012221548 A1 | 5/2013 |
| DE | 102015113735 A1 | 2/2017 |
| DE | 102020203914 A1 | 9/2021 |
| EP | 3620364 A1 | 3/2020 |

* cited by examiner

*Primary Examiner* — Christopher B Wehrly
(74) *Attorney, Agent, or Firm* — Norton Rose Fulbright US LLP

(57) ABSTRACT

A crank spindle set-up for a vehicle. The set-up includes a crank spindle for receiving a force/torque from pedaling using crank arms attached to ends of the crank spindle; an output shaft for receiving a force and/or a torque from the crank spindle; a mechanical coupling having a tap between the ends of the crank spindle, for transmitting force/torque from the crank spindle to the output shaft; a first magnetic region on/in the output shaft for generating and outputting a first magnetic field that is a function of the state of mechanical stress of the output shaft; a second magnetic region on/in the crank spindle at an axial distance from the tap, for generating and outputting a second magnetic field that is a function of the state of mechanical stress of the crank spindle; and a sensor set-up for detecting a magnetic field outputted by the crank spindle set-up.

11 Claims, 6 Drawing Sheets

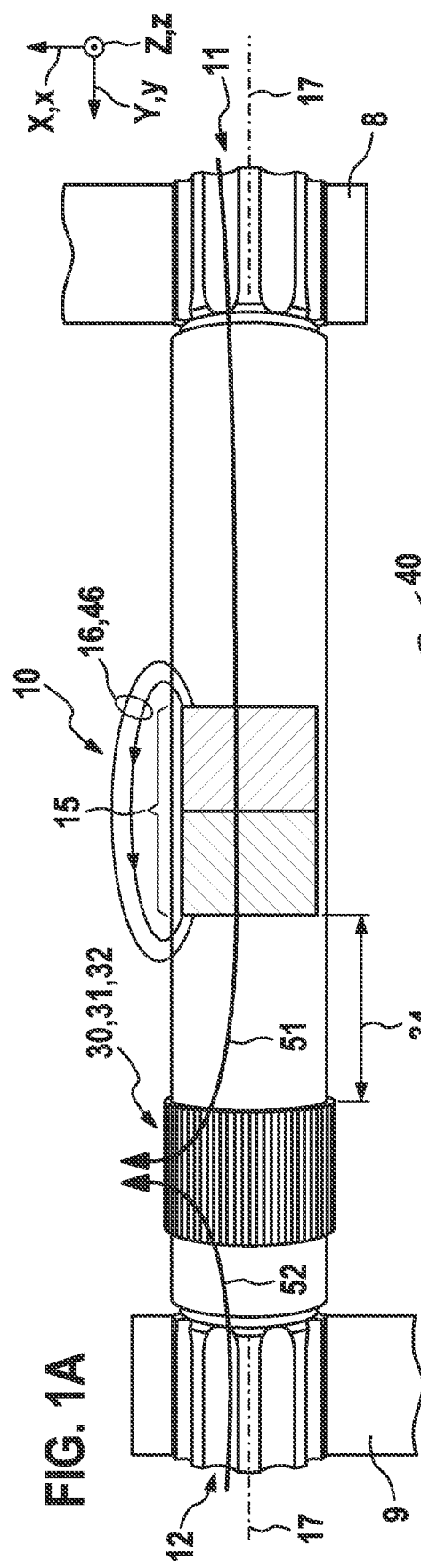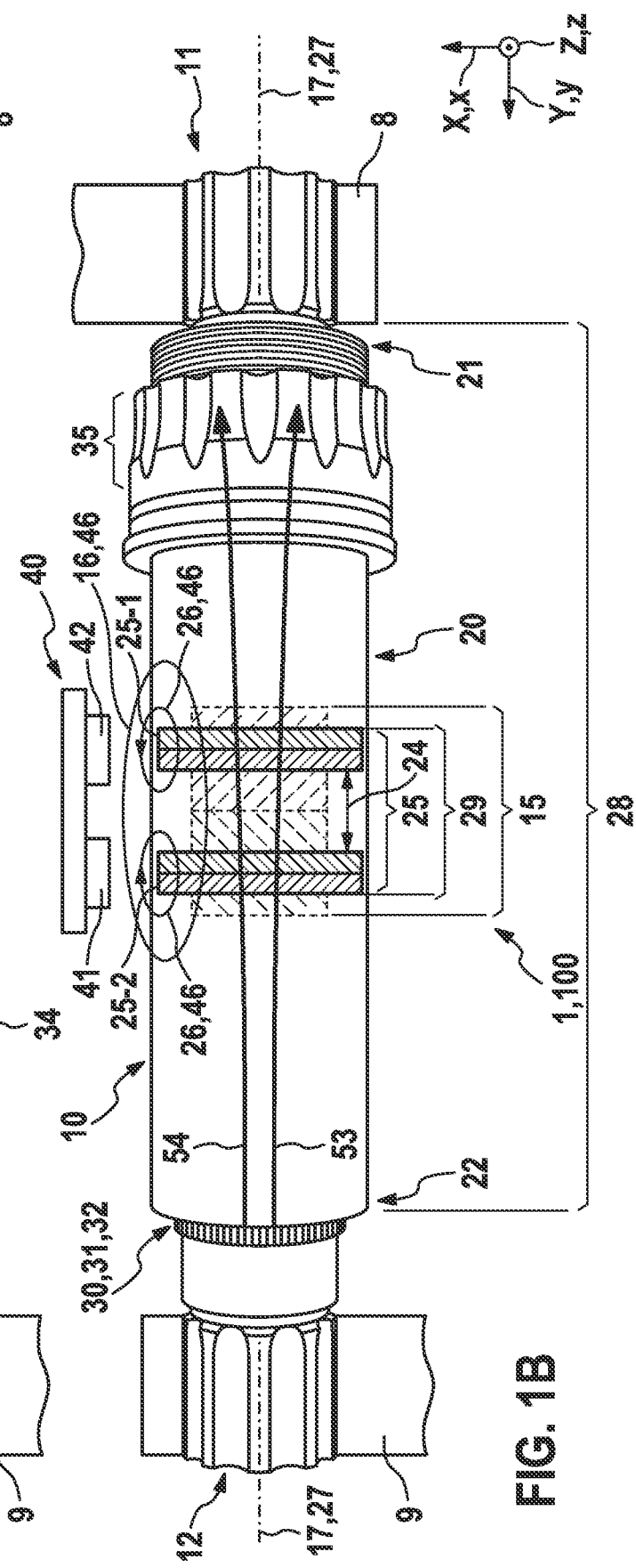
FIG. 1A
FIG. 1B

CRANK SPINDLE SET-UP, CONTROL AND/OR EVALUATION METHOD AND UNIT FOR A CRANK SPINDLE SET-UP, AND VEHICLE

CROSS REFERENCE

The present application claims the benefit under 35 U.S.C. § 119 of German Patent Application No. DE 10 2021 209 073.7 filed on Aug. 18, 2021, which is expressly incorporated herein by reference in its entirety.

FIELD

The present invention relates to a crank spindle set-up, a control and/or evaluation method, a control and/or evaluation unit for a crank spindle set-up, in particular, in each instance, for a vehicle capable of being propelled by muscle power and, if indicated, additionally by motor power, for an electric bicycle, e-bike, pedelec, or the like, as well as such a vehicle, as such.

BACKGROUND INFORMATION

In particular, in e-bikes, but also in other vehicles capable of being propelled by muscle power and, optionally, by motor power, as well, torque sensors are increasingly being used to measure torque; the torque sensors allowing a torque transmitted in a crank spindle set-up to an output shaft to be detected with regard to its value, in order to control, for example, a connected or connectable motive drive unit. In response to bringing the torques generated by pedaling and by the motive drive unit together onto the output shaft, mechanical superpositioning produces a type of summation of the individual torques, in which information about the source of the torque, right foot or left foot, is lost.

SUMMARY

A crank spindle set-up of the present invention may have the advantage, that left/right information may be reliably derived or obtained, using comparatively simple devices. According to an example embodiment of the present invention, this is achieved by providing a crank spindle set-up for a vehicle capable of being propelled by muscle power and, in particular, additionally by motor power, for an electric bicycle, e-bike, pedelec or the like; the crank spindle set-up being configured with a crank spindle for receiving or absorbing a force and/or a torque from pedaling, using crank arms attached to ends of the crank spindle opposite to each other; with an output shaft for receiving or absorbing a force and/or a torque from the crank spindle; with a mechanical coupling having a tap between the ends of the crank spindle for transmitting force and/or torque from the crank spindle to the output shaft; with a first magnetic region on and/or in the output shaft for generating and outputting a first magnetic field that is a function of the state of mechanical stress of the output shaft; with a second magnetic region on and/or in the crank spindle at an axial spatial distance from the tap of the mechanical coupling, for generating and outputting a second magnetic field that is a function of the state of mechanical stress of the crank spindle; and with a sensor set-up for detecting a magnetic field outputted by the crank spindle set-up. Using these steps, it is possible to qualitatively or quantitatively deduce a specific right/left portion of the overall torque from the superpositioning of the magnetic fields of the individual magnetic regions.

Preferred further refinements of the present invention are disclosed herein.

In one preferred specific example embodiment of the crank spindle set-up of the present invention, the output shaft is configured with or takes the form of a hollow shaft coaxial to the crank spindle, in particular, having a common axial direction y, Y, which corresponds, in particular, to the direction of the specific axis or axis of symmetry of the specific shaft 10, 20. This allows a particularly high degree of spatial proximity between the crank spindle and the output shaft for a particularly space-saving set-up.

Alternatively, or in addition, the output shaft may surround the crank spindle partially, completely, or substantially completely and may spatially overlap it in the common axial direction y, Y to form an axial, spatial overlap region, in order to attain, in this manner, a type of construction that is particularly compact spatially, for the entire crank spindle set-up.

In another preferred specific example embodiment of the crank spindle set-up of the present invention, the first magnetic region and the second magnetic region spatially overlap partially, completely, or substantially completely to form a spatial magnetic overlap region. Using this measure, the superposition of the individual magnetic fields may be detected at a particularly high degree of sensitivity.

In this context, the sensor set-up may be formed partially, completely, or substantially completely in the spatial magnetic overlap region in common axial direction y, Y, so that a particularly high degree of detection sensitivity is attained. The magnetic overlap region may be understood, e.g., as, but not only as, the one and, in particular, coherent spatial region, in which the first and second magnetic regions spatially overlap in common axial direction y, Y.

In another alternative or additional exemplary embodiment of the crank spindle set-up of the present invention, the second magnetic region is configured to generate the second magnetic field in the circumferential direction of the crank spindle as a function of angle, and to output it, in particular, in the form of positional and/or angular coding, and/or in accordance with a number, set-up, distribution and/or geometric shape of magnetic sections of the second magnetic region. Through these measures, a position and/or orientation of the crank spindle and the crank arms attached to the ends of the crank spindle may be detected or derived particularly reliably, and using comparatively simple devices.

Regarding the form of the sensor set-up, there are different options for adjusting the degree of detection in terms of sensitivity and accuracy to the specific requirements of the application.

Thus, it is particularly advantageous, if, according to another development of the crank spindle set-up of the present invention, the sensor set-up includes a plurality of, in particular, two sensors, the first magnetic region includes a corresponding plurality of magnetic sections spatially set apart from each other in the axial direction, the number of sensors corresponds to the number of magnetic sections, the sensors and the magnetic sections are aligned with each other in the axial direction of the output shaft, in one-to-one correspondence, and/or spatially overlap partially, completely, or substantially completely in their correspondence, and/or the second magnetic region is an individual, uniform, and/or simply coherent region, at least in common axial direction y, Y, which spatially overlaps all of the magnetic sections and/or all of the sensors in common, axial direction y, Y partially, completely, or substantially completely.

According to the present invention, it is also alternatively or additionally possible to axially set apart or move away the magnetization on the crankshaft from the torque sensor. In this case, one or more sensors must then be installed above the output shaft. Then, these only sense the magnetic field introduced on the right.

In addition, the present invention relates to a control and/or evaluation method for a crank spindle set-up, which is developed, in particular, in the manner of the present invention.

In one specific example embodiment of the control and/or evaluation method of the present invention, individually or in any combination with each other, the time characteristic of the signal measured by the sensor set-up is acquired and, in particular, recorded;

sections between two directly consecutive minima in the characteristic of the signal are recognized and/or rated as half phases of the signal;

half phases of the signal, whose signal values are shifted to greater absolute values in comparison with half phases directly adjacent in time are recognized as caused by the one side of the crank arm and are correspondingly rated either as "right" or "left," on the side of which the second magnetic region of the crank arm is formed relative to the axial position of the mechanical coupling; and, in particular, in each instance, the other half phases of the signal are recognized and rated as "left" and/or "right" (according to an alternative or additional view of the concept of the present invention, the set-up of the present invention may also be configured in such a matter, that the shift also becomes more negative in absolute value as a function of the direction of the magnetization and/or as a function of positive/negative torque); and for a device to be controlled, in particular, a basic vehicle, with regard to a signal measured currently by the sensor set-up, a control signal for a current "right" half phase and/or a control signal for a current "left" half phase is/are generated and outputted to the device for its control.

In a particularly preferred further example refinement of the control and/or evaluation method of the present invention, a specific control signal:

is representative of the value of the torque applied to the crank spindle;

is generated as a current, time-dependent signal and/or as a signal corresponding to the current characteristic of the signal measured by the sensor set-up;

is generated as a control signal for controlling a motor drive unit of the basic vehicle;

is generated as a control signal for storing a value in a storage device; and/or is generated as a control signal for controlling an acoustic, haptic and/or optical indicator.

Using the associations described above, the driver may also assess the fitness of his/her legs individually and/or then take it into account during training, if necessary, by determining, for example, the assistance by the motor differently for the left and the right and implementing it in the drive unit.

In addition, the present invention also relates to a control and/or evaluation unit for a crank spindle set-up built according to the present invention, as well as for its operation.

The control and/or evaluation unit is configured and includes devices to initiate, execute, and/or control a control and/or evaluation method of the present invention, and/or to be used in such a method.

Finally, the present invention also relates to a vehicle capable of being propelled by muscle power and, in particular, additionally by motor power, as such, and, in particular, an electric bicycle, e-bike, pedelec, or the like, which is configured with a drive unit having a crank spindle set-up according to the present invention and/or with a control and/or evaluation unit developed according to the present invention, and/or which is configured and has devices to initiate, execute, and/or control an evaluation and/or control method of the present invention, and/or to be used in such a method.

BRIEF DESCRIPTION OF THE DRAWINGS

Specific example embodiments of the present invention are described in detail below with reference to the figures.

FIG. 1A is a perspective side view of a crank spindle, which is built according to the present invention and may be used in the present invention; the spindle generating the magnetic field under load, and in a resting state, the actual and basic magnetization being applied or magnetized so as to run around in one direction;

FIG. 1B is a perspective side view of a crank spindle set-up of the present invention, including a crank spindle according to FIG. 1A and an output shaft, which is mechanically coupled to it and surrounds the crank spindle in the form of a hollow shaft;

DETAILED DESCRIPTION OF EXAMPLE EMBODIMENTS

Figure 2:
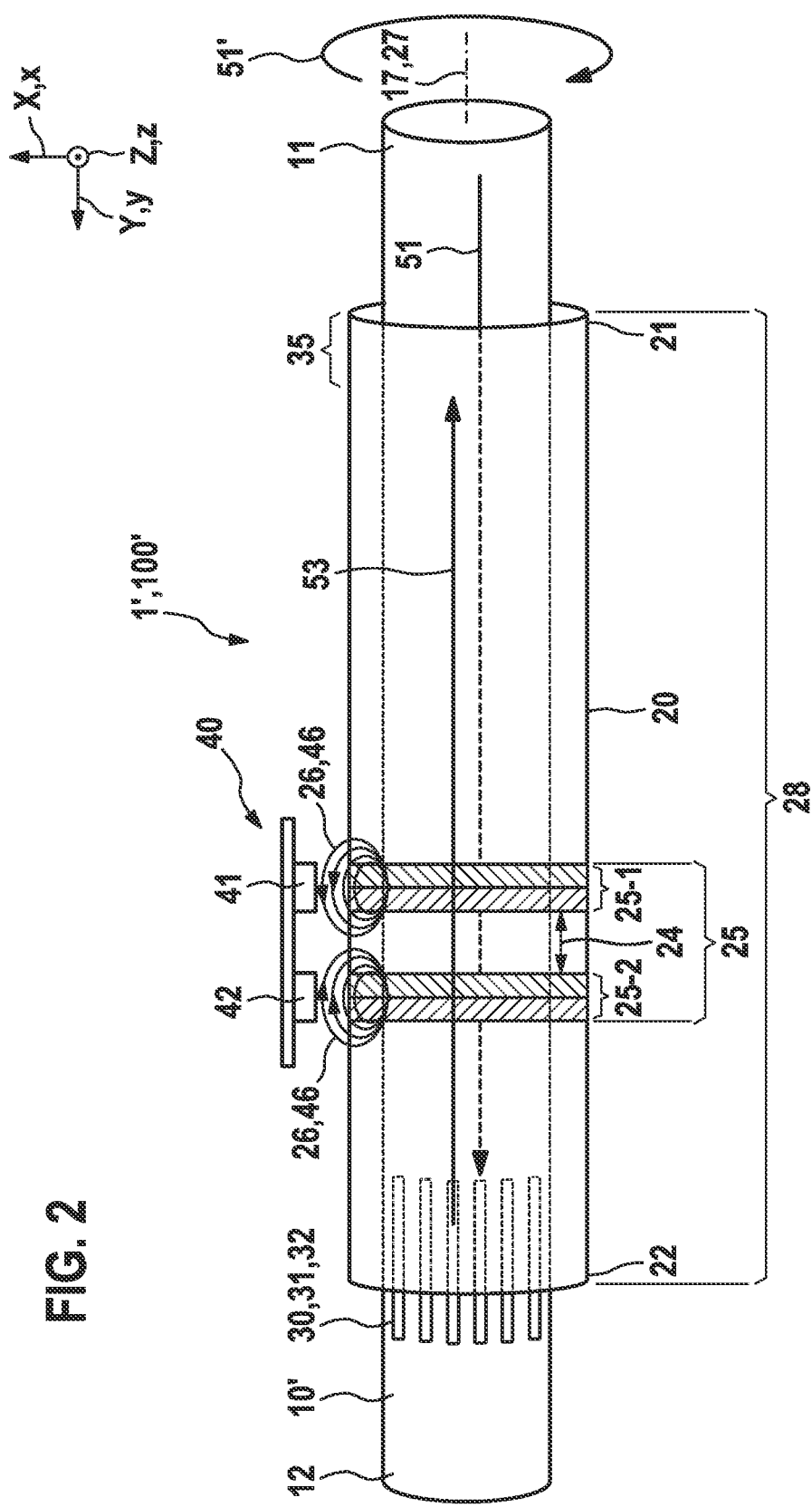
FIGS. 2 and 3 are schematic and partially cut side views of a conventional crank spindle set-up, where torques are introduced from the right and left by pedaling.

In the following, exemplary embodiments of the present invention and the technical background are described in detail with reference to FIGS. 1A through 7. Identical and equivalent elements and components, as well as elements and components functioning in the same or in an equivalent manner, are denoted by the same reference numerals. The detailed description of the denoted elements and components is not repeated in each case of their appearance.

The depicted features and further characteristics may be isolated from each other and combined with each other, as desired, without departing from the essence of the present invention.

FIG. 1A is a perspective side view of a crank spindle 10, which is built according to the present invention and may be used in the present invention.

The crank spindle 10 developed according to the present invention extends with its longitudinal axis 17 as an axis of symmetry of crank spindle 10, and its direction of longitudinal extension, in the direction of lateral extension Y of basic vehicle 1 and parallelly to the y-direction. In the assembled state, first and second crank arms 8 and 9 are attached to crank spindle 10, on the opposite right and left ends 11, 12, respectively, of crank spindle 10, in order to receive a force 51' on the right side or a torque 51 on the right side and/or a force 52' on the left side or a torque 52 on the left side, respectively, when a user is pedaling.

In order to transmit the torque 51, 52 introduced into crank spindle 10 by pedaling, to an output end and, in particular, to an output shaft 20, a mechanical coupling 30 is configured with a corresponding output for torque 51, 52 in the form of a tap 31, for example, in the form of simple gear teeth 32 or in the form of gearing. With regard to mechanical coupling 30 and its position along longitudinal axis 17 of crank spindle 10, the second magnetic region 15 provided and formed according to the present invention is situated a certain distance 34 from the mechanical coupling; the magnetic region being able to generate a second magnetic field 16 and output it into the surrounding space as a function of a state of mechanical stress of crank spindle 10.

Due to the position of second magnetic region 15 relative to mechanical coupling 30, the mechanical strain responsible for second magnetic field 16 occurs mainly in the region of crank spindle 10 and acts via specific crank arm 8 or 9, in which second magnetic region 15 lies in relation to mechanical coupling 30.

In the situation represented in FIG. 1A, generally, a magnetic field 16 is outputted only, when first or right-side crank 8 on first or right end 11 of crank spindle 10 is manipulated, in order to introduce a force 51' on the right side and, correspondingly, to generate a torque 51 on the right side; but not when manipulating the crank 9 on the left side, at second or left end 12 of crank spindle 10, in order to introduce a left-side force 52' and to generate a torque 52 on the left side.

FIG. 1B is a perspective side view of a crank spindle set-up 100 of the present invention, including a crank spindle 10 according to FIG. 1A and an output shaft 20, which is mechanically coupled to it and surrounds crank spindle 10 in the form of a hollow shaft.

Longitudinal axis 27 or axis of symmetry of output shaft 20 coincides with longitudinal axis 17 or axis of symmetry of crank spindle 10 in direction Y of longitudinal extension of basic vehicle 1 and the y-direction; shafts 10 and 20 are formed coaxially to each other. In this context, the output shaft 20 in the form of a hollow shaft, including its first or right end 21 and its second or left end 22, surrounds crank spindle 10 along common axial direction Y, y, in a spatial overlap region 28.

Output shaft 20 includes a first magnetic region 25 having a first or right-side magnetic section 25-1 and a second or left-side magnetic section 25-2, which are situated at a distance 24 from each other along common axial direction Y, y and spatially overlap second magnetic region 15 in common axial direction Y, y, thereby forming magnetic overlap region 29; the second magnetic region being simply coherent.

Due to mechanical coupling 30, the right-side torque 51 or left-side torque 52 generated, in each instance, in crank spindle 10 is transmitted to output shaft 20 as torque 53 and/or as torque 54 and transmitted to the transmission region 35 formed at first or right end 21 and, for example, to a chainring or another output element.

Due to the mechanical loading of both crank spindle 10 and output shaft 20, the states of mechanical stress in these shafts 10 and 20 produce, through the second and first magnetic regions 15 and 25, corresponding magnetic fields 16 and 26, respectively, or changes in magnetic field in the surrounding area of shafts 10 and 20, which may be detected as an overall magnetic field 46 or a change in it, by the sensor set-up 40 including one or more sensors 41 and 42.

In this context, first and second magnetic fields 26 and 16 are superposed to form a common magnetic field 46; essentially, only a second magnetic field 16 being generated, if a torque with regard to mechanical coupling 30 acts on the side of crank spindle 10, on which second magnetic region 15 is located. Thus, in the set-up according to FIGS. 1A and 1B, a second magnetic field 16 is only generated, if first or right crank arm 8 on first or right end 11 of crank spindle 10 is manipulated, since only this part of the crank spindle 10 having second magnetic region 15 is acted upon by a mechanical stress. If second or left crank 9 on second or left end 12 of crank spindle 10 is manipulated, then, in this case, second magnetic region 15 is essentially not affected, which means that essentially no second magnetic field 16 is generated and superposed with first magnetic field 26 of first magnetic region 25 to form an overall field 46.

This means that in the time characteristic of magnetic field 46, pedaling from the right side, using right crank 8, may be distinguished from pedaling from the left side, using left crank 9, in the phases of overall magnetic field 46.

Figure 3:
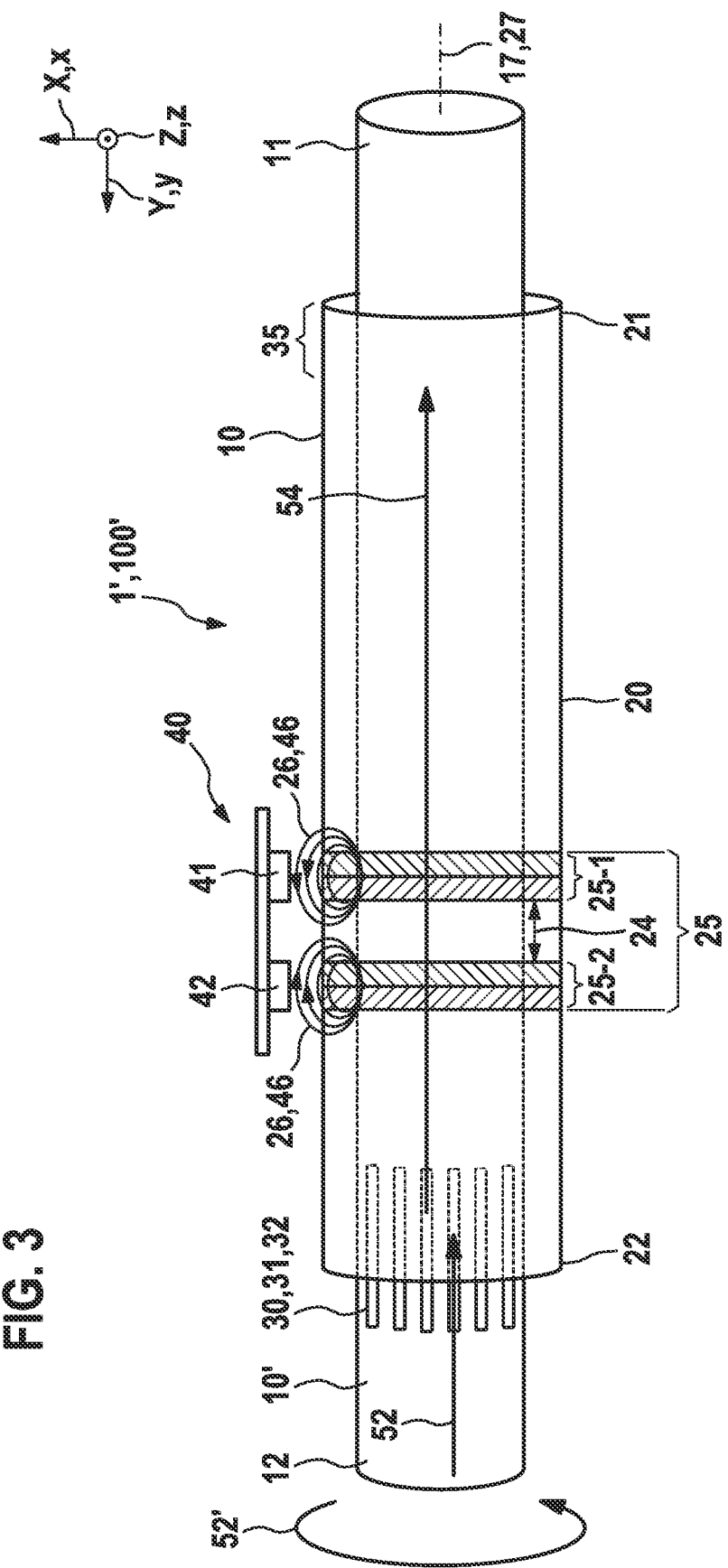

FIGS. 2 and 3 are schematic and partially cut side views of a conventional crank spindle set-up 100' of a conventional vehicle 1'; the conventional crank spindle set-up being for torques 51 and 52, which are introduced into the conventional crank spindle 10' not having a second magnetic region 15, by pedaling on the right and the left; with the aid of mechanical coupling 30, the introduced torques coming out as cumulative torques 53 and 54 in the output shaft 20 in the form of a hollow shaft.

Figure 4:
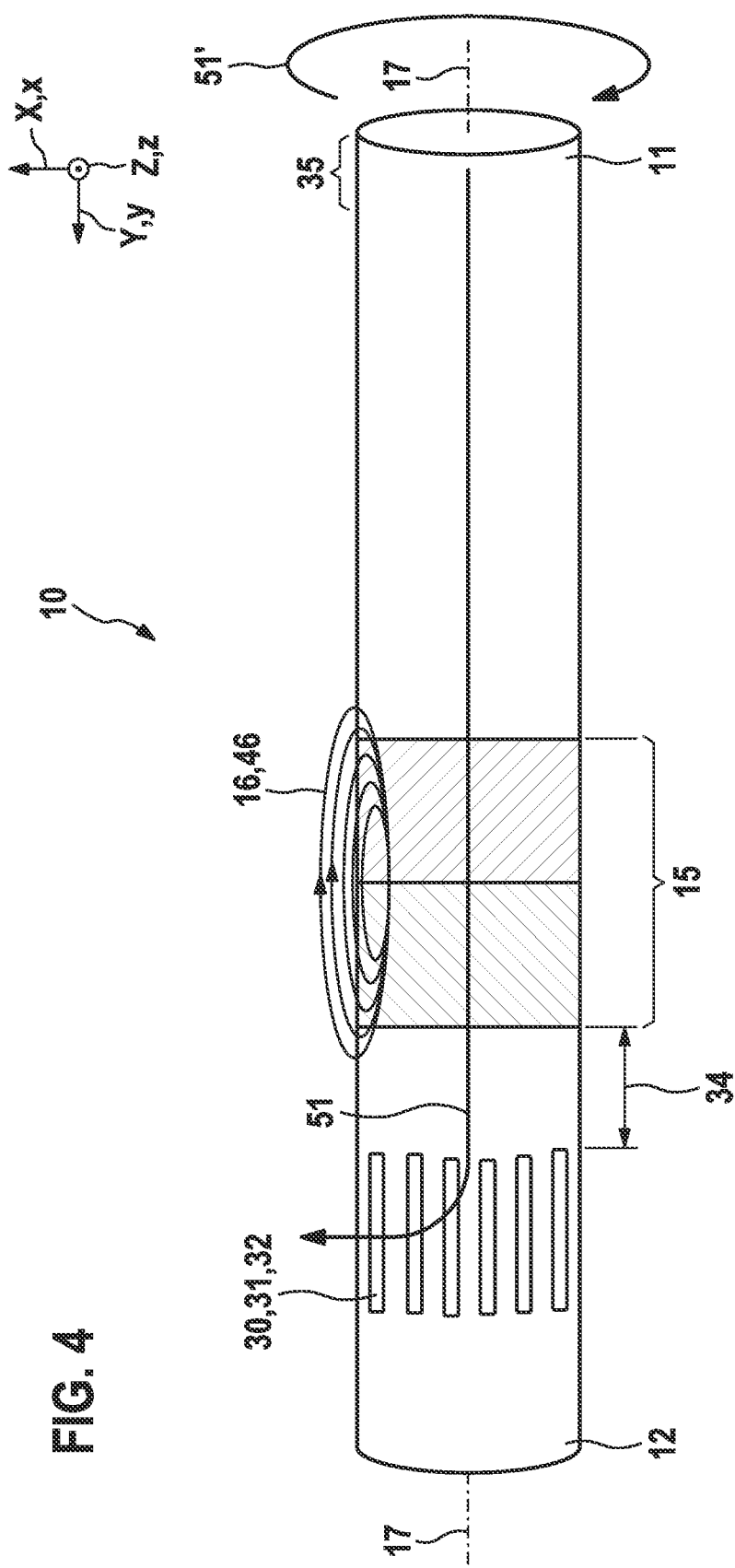
FIG. 4 is a schematic side view of a crank spindle formed according to the present invention, which is analogous to the representation from FIG. 1A and may be used in the present invention.

FIG. 4 is a schematic side view of a crank spindle 10 formed according to the present invention, which is analogous to the representation from FIG. 1A and may be used in the present invention. A state is shown, in which first or right crank 8 at first or right end 11 of crank spindle 10 is manipulated to introduce a right-side force 51' and to generate a right-side torque 51.

Figure 5:
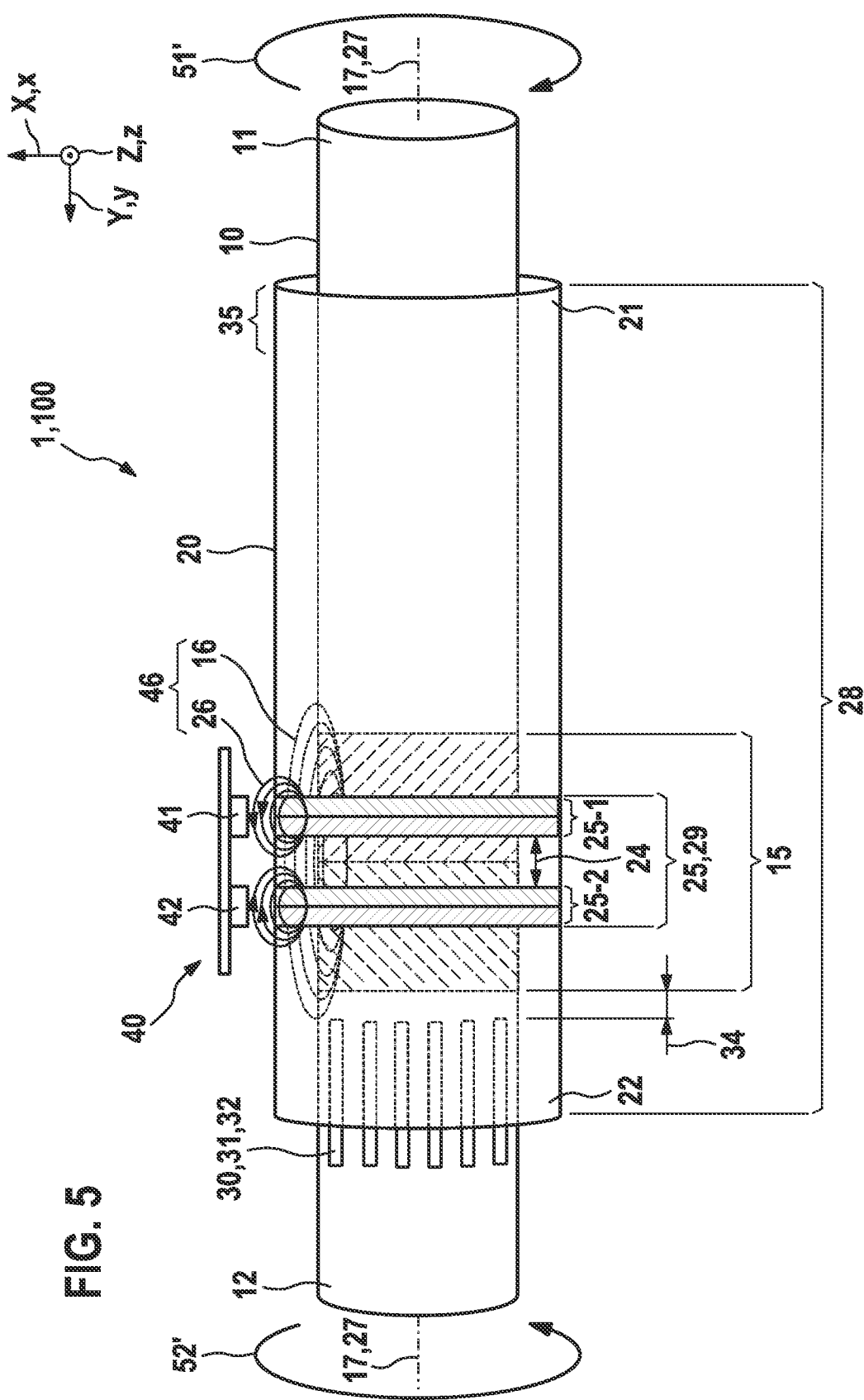
FIG. 5 is a schematic and partially cut side view of a crank spindle set-up of the present invention, including a crank spindle according to FIG. 4 and an output shaft, which is mechanically coupled to it and surrounds the crank spindle in the form of a hollow shaft.

FIG. 5 is a schematic and partially cut side view of a crank spindle set-up 100 of the present invention, including a crank spindle 10 of the present invention according to FIG. 4 and an output shaft 20, which is mechanically coupled to it and surrounds crank spindle 10 in the form of a hollow shaft.

Figure 7:
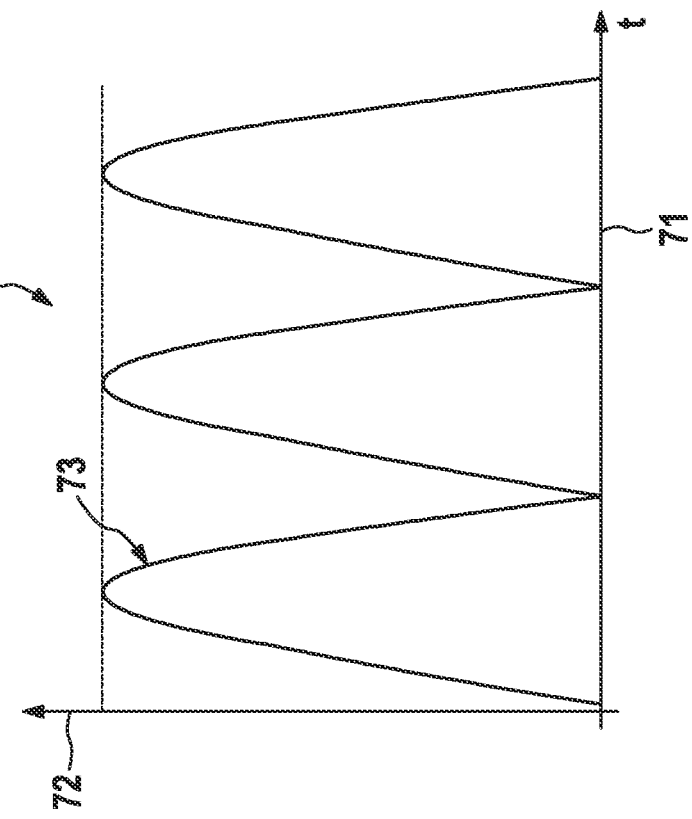
FIGS. 6 and 7 explain, with the aid of graphs, the detection of signals in the present invention, the signals having a connection with torques.
Figure 6:
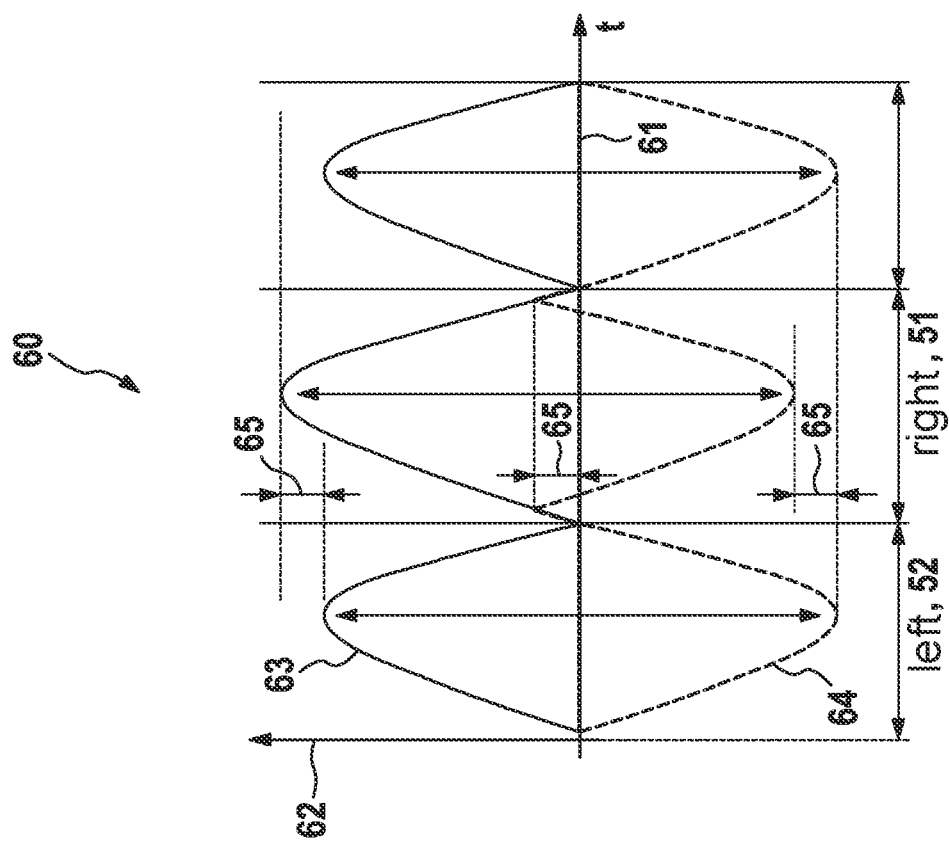

FIGS. 6 and 7 explain, with the aid of graphs 60 and 70, respectively, the detection of signals in the present invention, the signals having a connection with torques 51 through 54 and being from the detector set-up 40 that includes detectors 41 and 42.

In each instance, time t is plotted on abscissas 61 and 71, and in each instance, the sensor signal is plotted on ordinates 62 and 72; to be more precise, in the graph 60 shown in FIG. 6, the individual signals of sensors 41 and 42 of sensor set-up 40, and in graph 70, the differential signal of sensors 41 and 42.

During the evaluation of the signals, it must be taken into account that segments 25-1 and 25-2 of first magnetic region 25 in magnetic overlap region 29 are positioned opposite to each other with regard to their polarity. (In the resting state, that is, without any load on the shaft) The underlying magnetization is applied, in each instance, on the shaft in an encircling manner and oriented oppositely. In the figure, 25-1 and 25-2 show the behavior of this encircling magnetization under load.

Thus, in the traces 63 and 64 for the signals of sensors 41 and 42, the signal characteristics appear in the positive and in the negative range of ordinate 62; and the differential signal in trace 73 of graph 70 from FIG. 7 produces essentially the sum of the useful signal; interference signals being "filtered out" by subtraction. According to an alternative perspective, the sum of the signal or of the signals is the subtraction. Uniform interference fields are eliminated and negative sensor element characteristics, such as temperature drift, are compensated for by the subtraction.

In accordance with the crank spindle set-ups 100 of the present invention shown in FIGS. 1A, 1B, 4, and 5, a second magnetic field 16 is mainly generated only in response to manipulation on the right side, using first or right crank 8 at first or right end 11 of crank spindle 10. This results in a shift 65 of the corresponding phases of the signal characteristics of traces 63 and 64 for sensors 41 and 42, respectively, which are associated with the right, whereas the phases in traces 63 and 64 for the left do not have any shift at all.

These and additional features and characteristics of the present invention are elucidated further with the aid of the following explanations:

The present invention relates generally to the provision of device-specific and/or method-specific devices for the detection of left and right in an e-bike or in a general vehicle 1, using a torque sensor 40, 41, 42, which is, in particular, already formed and operates on the basis of a magnetic field; the vehicle being capable of being propelled by muscle power and, in particular, by motor power, as well.

In the case of conventional e-bikes 1 and the like, owing to the mechanics in a drive unit, pedaling causes torques 51, 52 of the left and right crank or crank arms 8, 9 at ends 11, 12 of a crank spindle or crankshaft 10 to be transmitted through a sensing region 40 of an output shaft 20 mechanically coupled to crank spindle 10, and, in this context, to be superposed or added. Due to this, the information regarding the foot, by which force 51', 52' and/or torque 51, 52 has been introduced into crank spindle 10, is lost.

One object of the present invention is to provide devices for detecting the side of the drive unit, via which torque 51, 52 is introduced during the pedaling, that is, for detecting if pedaling has been performed by the left or by the right foot, in particular, using an active torque sensor 40, 41, 42.

Advantages of the present invention include, inter alia, that novel options for controlling an e-bike 1 are provided, in order to respond differently, for example, in particular driving situations and as a function of left/right detection.

In addition, the concept of the present invention, including right/left detection, may be used for training operations, in order, for example, to reduce the motor assistance to one leg for strengthening the muscles in this leg.

In addition, a fitness function, in which the power output of the legs may differ as a function of the training, is possible. Using the type of sensor system of the present invention, a left and a right leg may be distinguished between during the motion. Using an HMI interface or an application, the fitness of the specific leg may be indicated to the user, in order to optimize his/her dynamic balance.

The two torques, that is, the muscular and motive torques, are added via the mechanical coupling 30 or gear teeth 31 between crankshaft 10 and the hollow shaft in the form of output shaft 20. In response to torsion, output shaft 20 normally outputs a magnetic field 26, 46 to sensors 41, 42, as well. The information regarding the application of force, that is, the side from which it is introduced, is lost in the conventional configuration. It is the aim of the present invention to overcome this problem.

For example, coils, AMR, TMR, Hall and other magnetic field sensors may be used for the sensing elements or sensors 41 and 42.

In the case of the e-bike or a general vehicle 1 capable of being propelled by muscle power, one idea of the present invention is to obtain or recover the directional information lost up to now, by additional, second magnetization 15 on the crankshaft or crank spindle 10, and by superposing corresponding, second magnetic field 16 with first magnetic field 26 of output shaft 20 to form an overall magnetic field 46.

Second magnetic field 16 of second magnetic region 15 on crank spindle 10 or crankshaft 10 only breaks out into the surrounding area in response to applying a force via the one, for example, the right, side.

If the crankshaft 10 modified according to the present invention, using second magnetic region 15, is inserted into a conventional output shaft 20 otherwise present, current sensor system 40 may measure the additional magnetic field 16 superposed with overall field 46.

In this context, differential signal 73 from FIG. 7 is not affected or, at most, slightly affected, since it is homogeneous.

A shift 65 in measured magnetic field 46 mainly takes place.

With regard to the signal behavior, the right foot, which applies force at first end 8 of crank spindle 10, and the left foot, which applies force at second end 9 of crank spindle 10, generate approximately sinusoidal signals or torque signals via cranks 8 and 9, respectively, using sensors 41 and 42, respectively, as is shown in graph 60 of FIG. 6 by traces 63 and 64 for sensors 41 and 42.

Due to the differential calculation of the signal or torque signal, uniform, second magnetic field 16 from second magnetic region 15 of crank spindle 10 is not detected, as is shown in graph 70 of FIG. 7 by trace 73.

However, individual sensors 41 and 42 of sensor set-up 40 detect shift 65 or the one offset shift, while with regard to the position of mechanical coupling 30 on the side of second magnetic region 15, the leg, in particular, the right leg, introduces a torque 51 into crank spindle 10.

The principle may also be applied to a single sensor 41, 42 and to other numbers of sensors 41, 42 and, in particular, to more than two sensor elements 41, 42 of sensor set-up 40 and to different circuits.

What is claimed is:

1. A crank spindle set-up for a vehicle capable of being propelled by muscle power and additionally by motor power, the crank spindle set-up comprising:
    a crank spindle configured to receive a force and/or a torque from pedaling using crank arms attached to ends of the crank spindle;
    an output shaft configured to receive a force and/or a torque from the crank spindle;
    a mechanical coupling having a tap between the ends of the crank spindle, configured to transmit force and/or torque from the crank spindle to the output shaft;
    a first magnetic region on and/or in the output shaft configured to generate and output a first magnetic field that is a function of the state of mechanical stress of the output shaft;
    a second magnetic region on and/or in the crank spindle at an axial distance from the tap of the mechanical coupling, configured to generate and output a second magnetic field that is a function of the state of mechanical stress of the crank spindle; and a sensor set-up configured to detect a total magnetic field output by the crank spindle set-up, wherein the total magnetic field results from a superposition of the first magnetic field and the second magnetic field.

2. The crank spindle set-up as recited in claim 1, wherein the vehicle is an electric bicycle, or an e-bike, or a pedelec.

3. The crank spindle set-up as recited in claim 1, wherein the output shaft:

is configured with or takes the form of a hollow shaft; and/or is formed coaxially to the crank spindle; and/or surrounds the crank spindle partially, or completely, or substantially completely, and overlaps it in a common axial direction to form an axial, spatial overlap region.

4. A crank spindle set-up, for a vehicle capable of being propelled by muscle power and additionally by motor power, the crank spindle set-up comprising:

a crank spindle configured to receive a force and/or a torque from pedaling using crank arms attached to ends of the crank spindle;

an output shaft configured to receive a force and/or a torque from the crank spindle;

a mechanical coupling having a tap between the ends of the crank spindle, configured to transmit force and/or torque from the crank spindle to the output shaft;

a first magnetic region on and/or in the output shaft configured to generate and output a first magnetic field that is a function of the state of mechanical stress of the output shaft;

a second magnetic region on and/or in the crank spindle at an axial distance from the tap of the mechanical coupling, configured to generate and output a second magnetic field that is a function of the state of mechanical stress of the crank spindle; and a sensor set-up configured to detect a magnetic field output by the crank spindle set-up, wherein in a common axial direction, the first magnetic region and the second magnetic region spatially overlap partially, completely, or substantially completely to form a spatial magnetic overlap region.

5. The crank spindle set-up as recited in claim 4, wherein the sensor set-up is formed partially, completely, or substantially completely in the magnetic overlap region, in the common, axial direction.

6. A crank spindle set-up, for a vehicle capable of being propelled by muscle power and additionally by motor power, the crank spindle set-up comprising:

a crank spindle configured to receive a force and/or a torque from pedaling using crank arms attached to ends of the crank spindle;

an output shaft configured to receive a force and/or a torque from the crank spindle;

a mechanical coupling having a tap between the ends of the crank spindle, configured to transmit force and/or torque from the crank spindle to the output shaft;

a first magnetic region on and/or in the output shaft configured to generate and output a first magnetic field that is a function of the state of mechanical stress of the output shaft;

a second magnetic region on and/or in the crank spindle at an axial distance from the tap of the mechanical coupling, configured to generate and output a second magnetic field that is a function of the state of mechanical stress of the crank spindle; and a sensor set-up configured to detect a magnetic field output by the crank spindle set-up, wherein the first magnetic region and the second magnetic region are configured to generate the second magnetic field in the circumferential direction of the crank spindle as a function of angle and to output it: (i) in the form of positional and/or angular coding, and/or (ii) in accordance with a number, and/or set-up, and/or distribution and/or geometric shape of magnetic sections of the second magnetic region.

7. The crank spindle set-up as recited in claim 1, wherein:

the sensor set-up includes a plurality of sensors; and/or the first magnetic region includes a corresponding plurality of magnetic sections spatially set apart from each other in the axial direction; and/or a number of the sensors corresponds to a number of magnetic sections; and/or the sensors and the magnetic sections are aligned in one-to-one correspondence with each other in an axial direction of the output shaft and/or spatially overlap partially, or completely, or substantially completely in their correspondence; and/or the second magnetic region is an individual, uniform, and/or simply coherent region, which spatially overlaps all of the magnetic sections and/or all of the sensors partially, or completely, or substantially completely in the common axial direction.

8. A control and/or evaluation method for a crank spindle set-up and its operation, the crank spindle set-up including:

a crank spindle configured to receive a force and/or a torque from pedaling using crank arms attached to ends of the crank spindle, an output shaft configured to receive a force and/or a torque from the crank spindle, a mechanical coupling having a tap between the ends of the crank spindle, configured to transmit force and/or torque from the crank spindle to the output shaft, a first magnetic region on and/or in the output shaft configured to generate and output a first magnetic field that is a function of the state of mechanical stress of the output shaft, a second magnetic region on and/or in the crank spindle at an axial distance from the tap of the mechanical coupling, configured to generate and output a second magnetic field that is a function of the state of mechanical stress of the crank spindle, and a sensor set-up configured to detect a magnetic field output by the crank spindle set-up;

the method comprising the following steps:

acquiring and recording a time characteristic of a signal measured by the sensor set-up;

recognizing sections between two directly consecutive minima in the characteristic of the signal as half phases of the signal;

recognizing, half phases of the signal, whose signal values are shifted to greater absolute values in comparison with half phases directly adjacent in time, as caused by one side of the crank arm and correspondingly rating the half phases as "right" or "left," on a side of which the second magnetic region of the crank arm is formed relative to the mechanical coupling, each of the half phases being recognized and rated as "left" and/or "right"; and generating for a device to be controlled with regard to the signal measured currently by the sensor set-up a control signal for a current "right" half phase and/or for a current "left" half phase, and outputting the control signal to the device for its control.

9. The control and/or evaluation method as recited in claim 8, wherein a specific control signal is:
representative of a value of the torque applied to the crank spindle; and/or
generated as a current and time-dependent signal and/or as a signal corresponding to a current characteristic of the signal measured by the sensor set-up; and/or
generated as a control signal for controlling a motor drive unit of a vehicle;
generated as a control signal for storing a value in a storage device; and/or
generated as a control signal for controlling an acoustic, haptic and/or optical indicator.

10. A control and/or evaluation unit for a crank spindle set-up the crank spindle set-up including:
a crank spindle configured to receive a force and/or a torque from pedaling using crank arms attached to ends of the crank spindle,
an output shaft configured to receive a force and/or a torque from the crank spindle,
a mechanical coupling having a tap between the ends of the crank spindle, configured to transmit force and/or torque from the crank spindle to the output shaft,
a first magnetic region on and/or in the output shaft configured to generate and output a first magnetic field that is a function of the state of mechanical stress of the output shaft,
a second magnetic region on and/or in the crank spindle at an axial distance from the tap of the mechanical coupling, configured to generate and output a second magnetic field that is a function of the state of mechanical stress of the crank spindle, and
a sensor set-up configured to detect a magnetic field output by the crank spindle set-up;
the control and/or evaluation unit configured to:
acquire and record a time characteristic of a signal measured by the sensor set-up;
recognize sections between two directly consecutive minima in the characteristic of the signal as half phases of the signal;
recognize, half phases of the signal, whose signal values are shifted to greater absolute values in comparison with half phases directly adjacent in time, as caused by one side of the crank arm and correspondingly rating the half phases as "right" or "left," on a side of which the second magnetic region of the crank arm is formed relative to the mechanical coupling, each of the half phases being recognized and rated as "left" and/or "right"; and
generating for a device to be controlled with regard to the signal measured currently by the sensor set-up a control signal for a current "right" half phase and/or for a current "left" half phase, and outputting the control signal to the device for its control.

11. A vehicle capable of being propelled by muscle power and additionally by motor power, and which is configured with a drive unit, the vehicle comprising:
a crank spindle set-up including:
a crank spindle configured to receive a force and/or a torque from pedaling using crank arms attached to ends of the crank spindle;
an output shaft configured to receive a force and/or a torque from the crank spindle;
a mechanical coupling having a tap between the ends of the crank spindle, configured to transmit force and/or torque from the crank spindle to the output shaft;
a first magnetic region on and/or in the output shaft configured to generate and output a first magnetic field that is a function of the state of mechanical stress of the output shaft;
a second magnetic region on and/or in the crank spindle at an axial distance from the tap of the mechanical coupling, configured to generate and output a second magnetic field that is a function of the state of mechanical stress of the crank spindle; and
a sensor set-up configured to detect a total magnetic field output by the crank spindle set-up,
wherein the total magnetic field results from a superposition of the first magnetic field and the second magnetic field.

* * * * *